US012640998B2

(12) United States Patent
Goyal et al.

(10) Patent No.: US 12,640,998 B2
(45) Date of Patent: May 26, 2026

(54) IMPLEMENTING OBSERVABILITY OF AN ASSET IN A CLOUD BASED ENVIRONMENT

(71) Applicant: HONEYWELL INTERNATIONAL INC., Charlotte, NC (US)

(72) Inventors: McMillan Goyal, Bangalore (IN);
Anjeneya Dubey, Atlanta, GA (US);
Sham Sharma, Atlanta, GA (US);
Debjoy Das, Mumbai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/636,318

(22) Filed: Apr. 16, 2024

(65) Prior Publication Data

US 2025/0323842 A1     Oct. 16, 2025

(51) Int. Cl.
| | |
|---|---|
| *H04L 41/16* | (2022.01) |
| *H04L 41/22* | (2022.01) |
| *H04L 41/5009* | (2022.01) |
| *G06F 11/30* | (2006.01) |
| *G06F 11/32* | (2006.01) |

(52) U.S. Cl.
CPC .......... *H04L 41/5009* (2013.01); *H04L 41/22* (2013.01)

(58) Field of Classification Search
CPC ..... H04L 41/5009; H04L 41/22; H04L 41/16; G06F 11/32; G06F 11/30

USPC ......................................................... 709/224
See application file for complete search history.

(56) References Cited

U.S. PATENT DOCUMENTS

| | | | | |
|---|---|---|---|---|
| 11,876,858 | B1 * | 1/2024 | Nair | .................... H04L 67/1008 |
| 12,014,634 | B1 * | 6/2024 | Nair | ......................... G08G 1/20 |
| 12,020,140 | B1 * | 6/2024 | Mondlock | ............ G06N 3/0455 |
| 12,106,205 | B1 * | 10/2024 | Jain | ......................... G06N 3/084 |
| 2020/0136994 | A1 * | 4/2020 | Doshi | ................. G06F 16/1865 |

* cited by examiner

*Primary Examiner* — Jude Jean Gilles
(74) *Attorney, Agent, or Firm* — Alston & Bird LLP

(57) ABSTRACT

A system for metric collection and performance analysis of an asset in a network having one or more processors, a memory, and one or more programs stored in a memory, the one or more programs comprising instructions configured to identify a plurality of products associated with the asset, wherein each product is configured to generate one or more metrics associated with performance of said product, retrieve one or more metrics associated with one or more products, determine a key performance indicator for one or more of the metrics, assign a threshold value to one or more key performance indicator to determine performance of the one or more products, transmit a prompt to a user, when the key performance indicator associated with one or more products is below the threshold value and generate a dashboard, said dashboard presenting a report corresponding to one or more key performance indicator for associated metrics and the threshold value.

18 Claims, 9 Drawing Sheets

100

User inputs the type of dashboard to be implemented for an asset
S601

Identify and retrieve relevant metric at different levels associated with the asset
S602

Stitch all information obtained from metrics of different levels
S604

Compare KPIs with a threshold
S605

Observability as a dashboard
S606

Create Dashboard

Dashboard Title ○

| Dashboard Title |
|---|

Product Name ○

| Product Name ∨ |
|---|

Folder Name ○

| Folder Name ∨ |
|---|

Create a new Folder +

Black box Name ○

| BlackBox Name ∨ |
|---|

Regions ○

| Regions ∨ |
|---|

FIG. 8

IMPLEMENTING OBSERVABILITY OF AN ASSET IN A CLOUD BASED ENVIRONMENT

TECHNICAL FIELD

Embodiments of the present disclosure generally relate to implementing observability in a cloud-based environment, and specifically, to a system and method for implementing observability of plurality of metrics of an asset, in a cloud-based environment to a user.

BACKGROUND

Conventional systems for monitoring the performance of a product or application are generally based on managing and correlating data between different sources over a period of time. Conventional monitoring systems may allow some visualization of data with the help of graphs and dashboards, which are usually pre-configured. However, such conventional systems do not provide a cumulative understanding or a combination of different logs or metrics related to a product or application. Further, while monitoring of some metrics may be performed by conventional systems, no system level view is provided to customers. Further, in conventional systems, even if a limited view can be built for a given metric, processes such as adding of data and manually writing scripts are inefficient and provide incomplete user observability. Thus, there are several technical challenges and difficulties associated with existing methods and systems for monitoring data and implementing observability.

Systems for ensuring optimal performance of applications have been in demand ever since such applications were first deployed. Initially applications or services were composed of fewer elements, and merely monitoring of such applications or services were sufficient for ensuring optimal performance. Over time, monitoring of services or applications have undergone substantial developments, and a plurality of tools and systems have been developed for efficient monitoring of the services. The monitoring function performed by such tools and systems primarily involve the identification of errors or issues arising within the infrastructure, network, or other assets of a service or application. The errors and issues identified by such tools belong to a previously known set of possible outcomes. Hence monitoring tools have been used to identify a known set of issues or errors that may arise for an application or service.

Monitoring performed by different tools or systems involves collection and analysis of system data to ensure functioning of the system is as per optimal levels. The predefined parameters measured under monitoring provides an understanding regarding predictable mode of failures of the system. The understanding obtained based on the monitoring operations are generally provided to the users of the monitoring tools by means of visual representation of data such as dashboards. The visual representation provided by monitoring tools indicates or alerts a user when output from monitored components of the application or service is not optimum. The monitoring tools thereby aid the users in identifying and rectifying issues that arise within or with respect to their application, service or product which lead to sub-optimal performance or outputs.

The monitoring approach that has been consistently developed and worked upon with respect to monitoring of performance of applications and services has been that of Application Performance Monitoring (APM). APM has been adopted as a monitoring practice to understand and improve system performance, and helps users of a service, such as IT teams. in identifying when an application is slow or broken and then fix issues before they affect users. Through pre-configured alerts and visualizations, APM helps teams understand metrics like response time, throughput, and errors. APM can be used for monitoring the performance of websites, mobile apps, servers, networks, APIs, cloud-based services, and other technologies. However, APM is a type of monitoring designed specifically for tracking end-to-end transactions within particular applications. While APM can provide support and strengthen application performance, it remains limited to particular application, and thus cannot provide monitoring at the product level for the entire IT system. Further, many modern application architectures are too complex to monitor and manage with just an APM. Hence, there arises a requirement for a method or system which provides insights regarding the health and performance of the entire IT architecture associated with services or products or asset, and not merely limited to assessment of performance of applications.

Through applied effort, ingenuity, and innovation, the applicant has solved problems related to implementing observability of plurality of metrics as a service in a cloud-based environment.

BRIEF SUMMARY

In general, embodiments of the present disclosure herein provide system and method for efficient handling of temporal delays in data processing pipelines, post device reconnection. Other implementations will be, or will become, apparent to one with skill in the art upon examination of the following figures and detailed description. It is intended that all such additional implementations be included within this description be within the scope of the disclosure and be protected within the scope of the following claims.

In accordance with an embodiment of the present disclosure, an exemplary system for implementing observability of an asset is provided. The system comprises one or more processors, a memory, and the one or more programs which identify a plurality of products associated with the asset such that each product is configured to generate one or more metrics associated with performance of said product. The system further retrieve one or more metrics associated with one or more products and determine a key performance indicator (KPIs) for one or more of the metrics. The system further assigns a threshold value to one or more key performance indicator to determine performance of the one or more products, transmits a prompt to a user, when the key performance indicator associated with one or more products is below the threshold value and generates a dashboard, said dashboard presenting a report corresponding to one or more key performance indicator for associated metrics and the threshold value.

In another embodiment, the present disclosure provides a method implementing observability of an asset. The method according to the present disclosure comprises identifying a plurality of products associated with an asset, said product is configured to generate one or more metrics associated with performance of said product; retrieving one or more metrics associated with one or more products; determining a key performance indicator for one or more of the metrics; assigning a threshold value to one or more key performance indicator to determine performance of the one or more products; transmitting a prompt to a user, when the key performance indicator associated with one or more products is below the threshold value; and generating a dashboard, said dashboard presenting a report corresponding to one or more key performance indicator for associated metrics and the threshold value.

In yet another embodiment, the present disclosure provides a non-transitory computer-readable storage medium comprising computer program code for execution by one or more processors of an apparatus for implementing observability of an asset. The computer program code is configured to, when executed by the one or more processors, cause the apparatus to identify a plurality of products associated with the asset, said product is configured to generate one or more metrics associated with performance of said product; retrieve one or more metrics associated with one or more products; determine a key performance indicator for one or more of the metrics; assign a threshold value to one or more key performance indicator to determine performance of the one or more products; transmit a prompt to a user, when the key performance indicator associated with one or more products is below the threshold value; and generate a dashboard, said dashboard presenting a report corresponding to one or more key performance indicator for associated metrics and the threshold value.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

4

Figure 7:
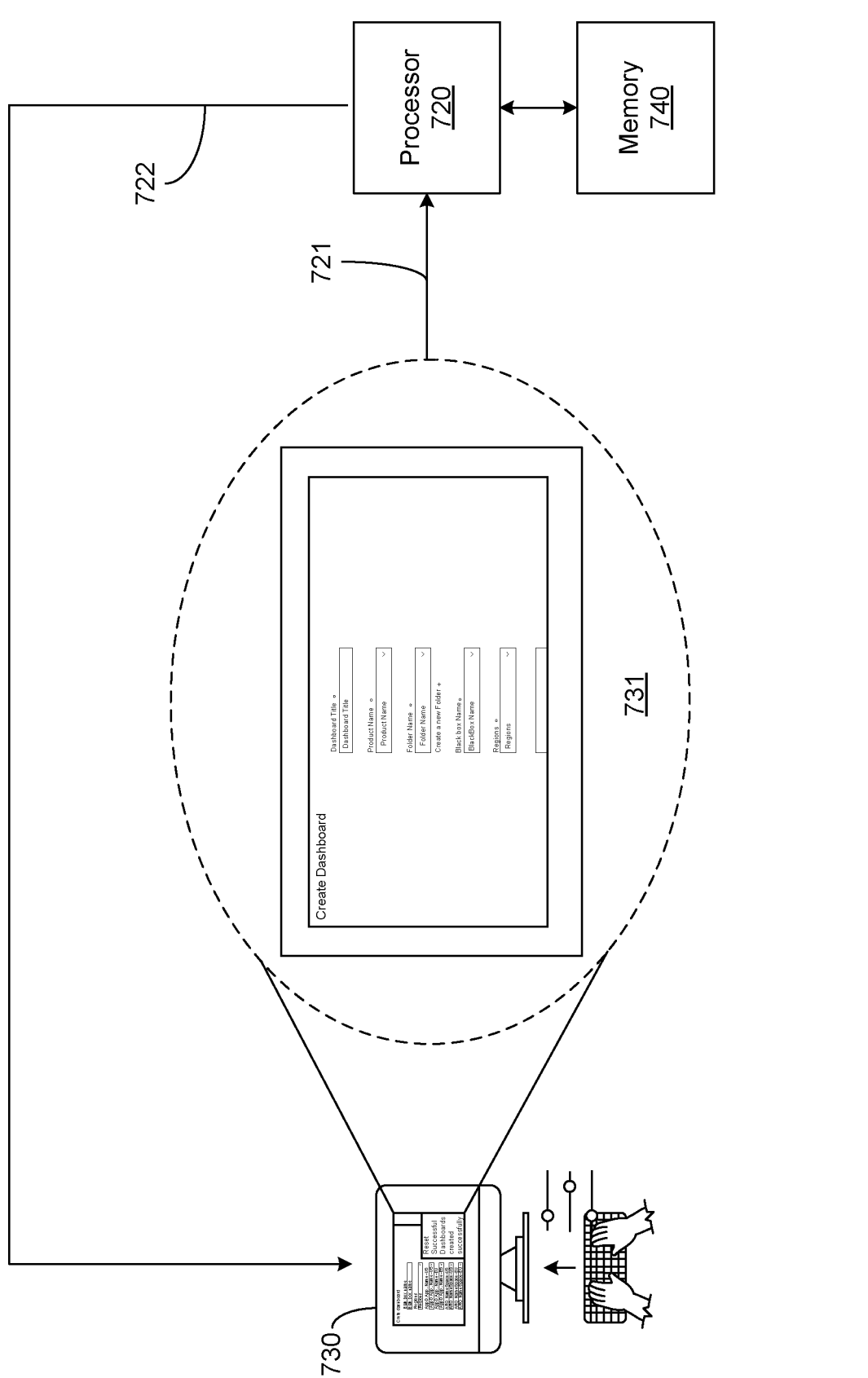

FIG. 7 illustrates a process flow for creating a dashboard for implementing observability, in accordance with an embodiment of the present invention.

FIG. 8 illustrates a user interface for creating a dashboard for implementing observability, in accordance with an embodiment of the present invention.

Figure 9:
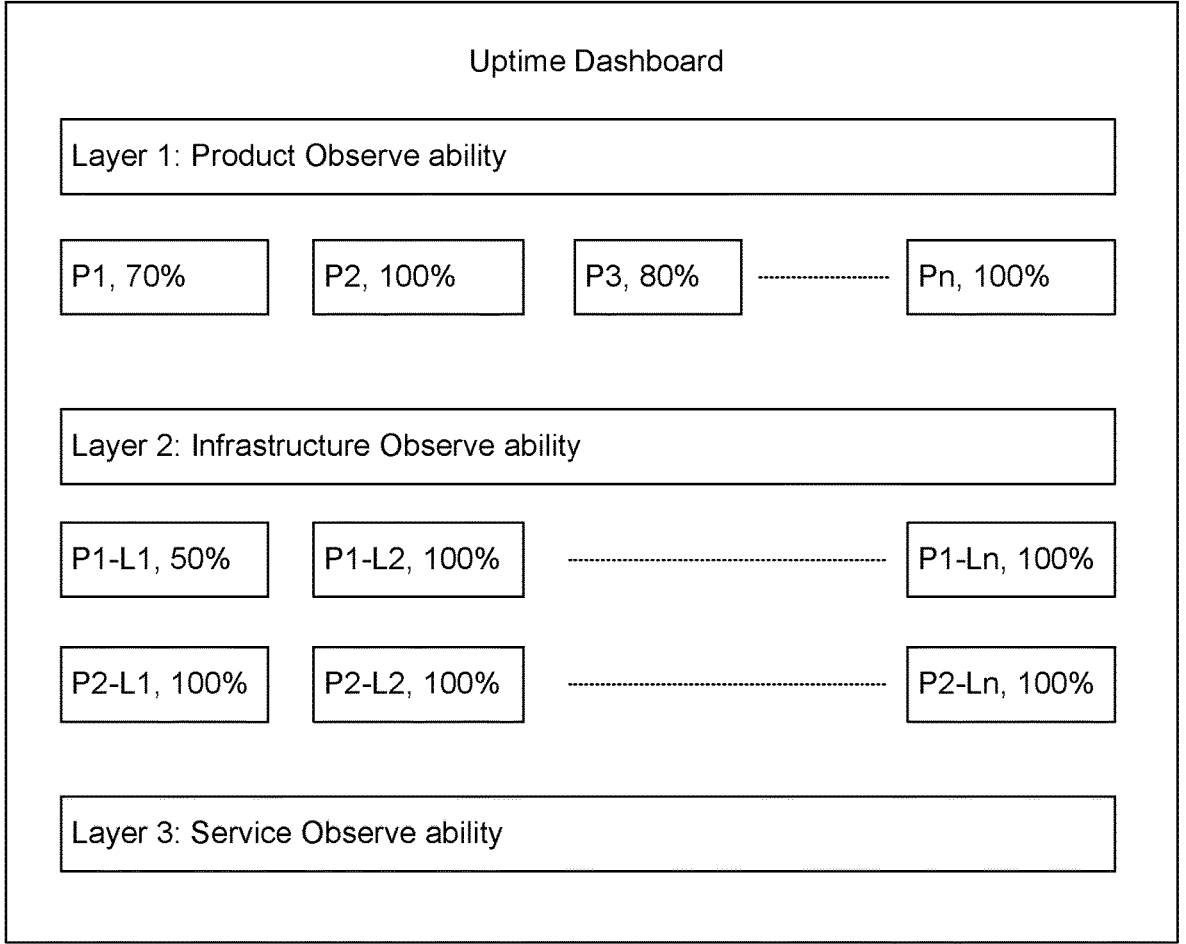

FIG. 9 illustrates a dashboard view for implementing observability, in accordance with an embodiment of the present invention.

DETAILED DESCRIPTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labelled with the same reference numerals. However, sometimes these elements may be labelled with differing numbers, such as, for example, in cases where such labelling facilitates a clearer description. Additionally, the drawings set forth herein are not necessarily drawn to scale, and in some instances, proportions may have been exaggerated to more clearly depict certain features. Such labelling and drawing practices do not necessarily implicate an underlying substantive purpose. As stated above, the specification is intended to be taken as a whole and interpreted in accordance with the principles of the invention as taught herein and understood to one of ordinary skill in the art.

With respect to the exemplary systems, components and architecture described and illustrated herein, it should also be understood that the embodiments may be embodied by, or employed in, numerous configurations and components, including one or more systems, hardware, software, or firmware configurations or components, or any combination thereof, as understood by one of ordinary skill in the art. Accordingly, while the drawings illustrate exemplary systems including components for one or more of the embodiments contemplated herein, it should be understood that with respect to each embodiment, one or more components may not be present or necessary in the system.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

Current IT and cloud-based systems are highly complex and dynamic. The ability of an organization to measure system performance/state is of prime importance for identifying causes of failure and for addressing issues related to performance. However, measuring such performance is particularly challenging in cloud-based system as they are highly complex and distributed. Obtaining high level view (or observability) of the system performance based on various parameters, logs, metrics in a distributed cloud-based system is, therefore, desirable.

The present disclosure provides a system and method for implementing observability by obtaining relevant metrics, stitching such metrics to obtain information relevant for monitoring, and displaying such information in a desired user-friendly format by way of a dashboard. The present disclosure further provides for evaluating performance of relevant metrics, which can help in identify root cause and help track issues even before they substantially impact the system. Relevant metrics needed for implementing observability may be obtained from various independent modules and each of such modules may require a unique interface for communication. The stitched data obtained by processing of metrics associated with the asset aims to achieve observability of the performance of different aspects of the asset at various levels and of the asset as a whole. Further, the evaluation of various metrics against a pre-defined threshold and providing this performance analysis as part of a dashboard improves observability for a user. The asset may be a product, a service, an application, or a combination of one or more of product/service/application corresponding to which observability is to be achieved. The stitched data is provided as output using a dashboard to enable visualization and comprehensibility of the data. The system of the present disclosure may be implanted as a standalone module having its own processor, memory, input/output interfaces or may be implemented software or service which may be implemented on a server. Such server may be a cloud based or may be an entity specific unit. Before elaborating the implementation of the present system in accordance with the present disclosure, it is imperative to first explain the relevant existing prior art.

Methods such as monitoring, and advanced approaches of monitoring such as APM are insufficient to meet the requirement of modern products, applications, and services. With the increasing complexity and interconnectivity of different architecture and networks supporting the performance of different applications, services, and products, there is an increasing need of identifying faults or errors of the underlying systems before such errors arise to ensure preemptive rectification of such errors. Such preemptive rectification or management of faults and errors are essential for efficient functioning of modern applications and services. A deeper understanding of a service or application and its flows is needed to understand the reasons behind faults in complex systems, which is not completely provided for by mere monitoring of the services or applications. Further, monitoring and APM techniques are static in their functionality, and are limited with respect to the understanding they provide a user regarding an asset. While different aspects related to performance of the asset based on monitoring of the metrics may be understood, the causes of sub-optimal performance, and insights regarding actions to be taken to improve performance or resolve faults in the asset.

Further, a method of identifying unknown faults or errors is required in applications and services comprising complex architectures and network infrastructures. In a monitoring scenario, you typically preconfigure dashboards to alert you about performance issues you expect to see later. However, these dashboards rely on the key assumption that you're able to predict what kinds of problems you'll encounter before they occur. Applications and services operating on or using cloud-native environments don't lend themselves well to this type of monitoring because they are dynamic and complex, which means you have no way of knowing in advance what kinds of problems might arise.

Hence assessment of performance and faults of a service or application merely based on monitoring of metrics associated with such services are insufficient for obtaining a comprehensive knowledge of how to achieve optimum performance. Such a requirement has led to the development of concept of observability of a service or application. Observability can be understood as the ability to assess an internal system's state based on the data it produces. An observability platform helps users observe and gain deeper insight into the health and status of different applications and resources across an IT infrastructure. By garnering insights from each system's data, users such as IT teams can proactively detect abnormalities, analyze issues, and resolve problems. While it sounds similar to traditional monitoring, observability is a superset of monitoring as it also focuses on "unknown unknowns", i.e., a problems or faults which may not be premeditated by IT teams or developers of an application or service. These are the unpredictable ways a complex system, with many intertwined components, can fail. Observability helps is obtaining deep, technical insights into the state of your entire system, no matter how large or complex it is. Observability also gives you the power to understand patterns and connections in data obtained from the different components of the service or application that was not previously considered.

The concept of observability includes the automation of data collection from an array of sources and services together in one place, and helps monitor the health of an application or service by visualizing its performance, and then give you the insights to take necessary actions. These insights help you understand not just that something happened, but why, with all the tools at your fingertips to take necessary actions. The concept of observability is aided by the use of monitoring methods or tools, and hence an approach of combining concepts of observability and monitoring may be used to provide optimal results. In addition to advantages and benefits offered by observability, a system for achieving observability may be strengthened if concepts of observability are achieved at a macro level.

Embodiments of the present disclosure provides a system and method for achieving observability of an asset based on monitoring of different metrics associated with the asset, obtaining KPIs and comparing them with a threshold to alert a user. The proposed system aids in achieving observability, and providing a singular view or visualization regarding the performance and faults of the asset. Additionally, the system would further provide insights regarding the entire product their associated infrastructures and services. Further, the present system may provide insights as to actions to be taken to achieve optimum performance of the asset. Furthermore, the system may aid in detecting abnormalities and analyzing issues before they occur.

In some embodiments, various metrics of the asset may be monitored using a variety of monitoring tools or methods. The metrics monitored may either be collected or processed to aid the system in achieving observability. Further, the process of achieving observability may be implemented as a software on the proposed system. Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Figure 1:
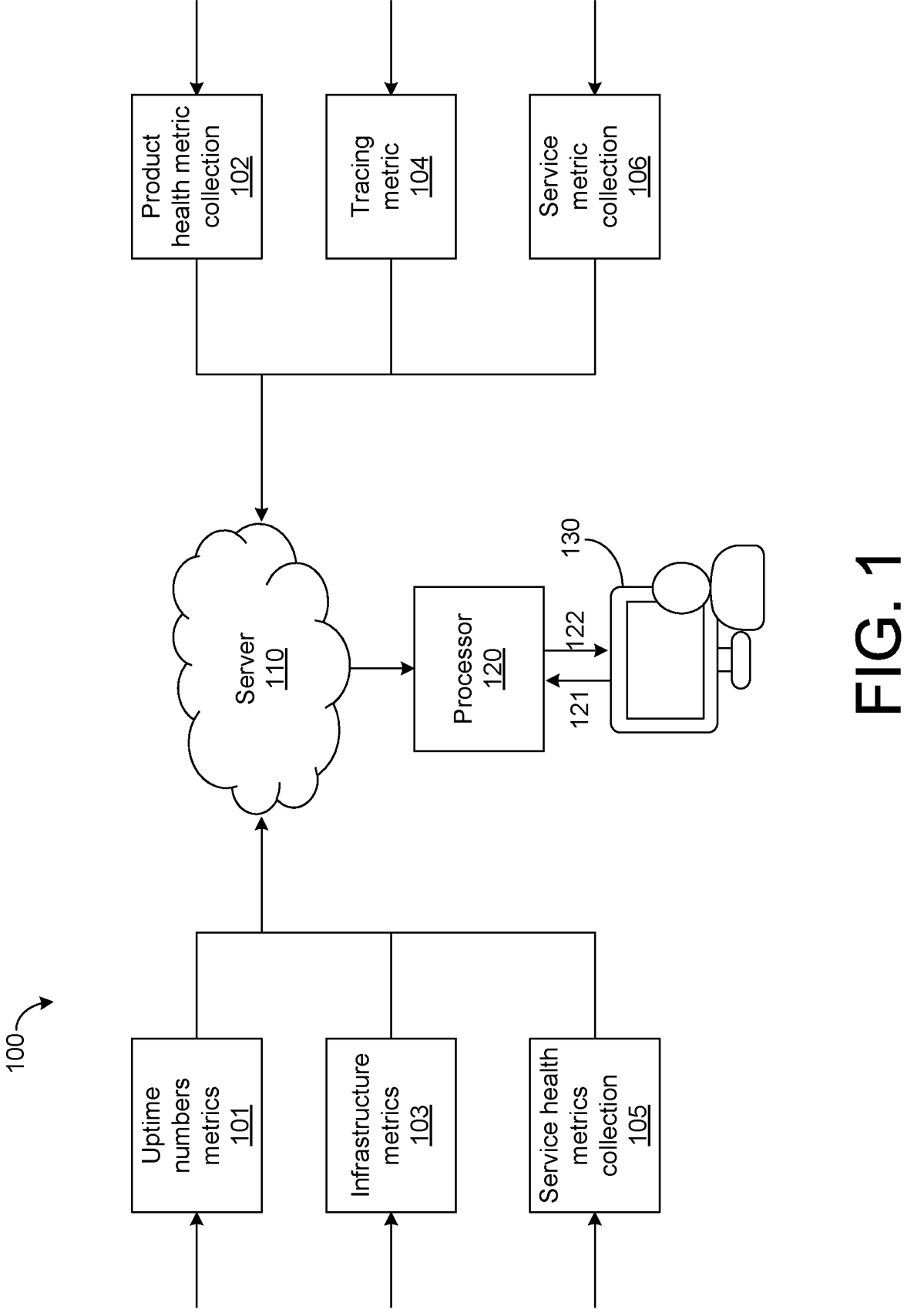
FIG. 1 illustrates a block diagram of a system for implementing observability, in accordance with an embodiment of the present invention.

FIG. 1 illustrates a block diagram of a system 100 for achieving observability, in accordance with an embodiment of the present invention. In an embodiment, the system 100 achieves observability based on metrics related to an asset, obtained from various components or constituting elements of the asset. The metrics of the asset are monitored using different methods or tools of monitoring, and the metrics monitored may be processed or used directly or their underlying data may be used by the system 100. In various embodiment, the monitoring of metrics is may be performed by methods including Health Check monitoring, APM monitoring, Uptime calculations and service level monitoring using tools including Kubernetes and Azure. The metrics used by the system may include uptime numbers metrics 101, product health metrics 102, infrastructure metrics 103, tracing metrics 104, service health metrics 105, and service metrics 106. The metrics or data obtained from processing of metrics may be collected using a plurality of collectors assisted by APIs (Application Programming Interfaces), at a server 110. The metrics or data collected at the server 110 is stitched using a processor 120 based on instructions stored in a memory (not shown). Such memory may be part of the server or a may be a standalone data storage device. Data stitching is the process of aggregating metrics obtained from different sources to provide user a meaningful observability of their asset. Observability is achieved from the stitched data as it provides a holistic understanding of the performance of the asset, identify faults and errors which may arise or have already occurred in the asset, and monitoring of the services provided by the asset. The stitched data is provided as output 130, in the form of a dashboard, from the processor 120 using a single dashboard to provide an enhanced visualization and understanding of the stitched data. A template for the dashboard may be selected from a variety of templates (like SRE Dashboard, Postgres Dashboard, Cost Dashboard, Security Dashboard, Uptime Calculations etc) such that the selected template provides an appropriate visualization of the output. In some embodiments, the processor 120 may be hosted by the server 110, in contrast to the structure presented in FIG. 1. When the processer 120 is hosted in the server, the processing and stitching of the metrics and the information obtained from processing of metrics may be performed within the server, and the output 122 is provided by the server to a user of the system 100 by means of dashboard.

The metrics used by the system as defined in FIG. 1 may include uptime numbers metrics 101, product health metrics 102, infrastructure metrics 103, tracing metrics 104, service health metrics 105, and service metrics 106. These metrics represent an asset's performance on different parameters at different levels, as explained hereinafter. An asset may have one or more products in it and each of such product may have its own infrastructure. Further, each infrastructure of each of the product may have several individual services performing their assigned functionality. From the perspective of implementing observability of an asset, information (or metrics) relating to performance of each level (i.e. product, infrastructure and service) may be relevant. Therefore, for implementing observability, metrics relating to these levels must be obtained. However, for an asset involving several products each having its own infrastructure and services, the metrics may not be accessible at a single location and must be obtained. For instance, metrics relating to uptime of a product may be stored in the uptime number metrics 101 stored in a database. Also, metrics relating to health of a product may be stored in the product health metrics 102. These metrics 101 and 102 provide asset performance information at the highest level, i.e. at the product level.

The uptime numbers metrics 101 provides performance at the product level such that details relating to uptime performance of each product of an asset is stored. Uptime numbers may include details relating to current status of the product, past status, average uptime performance for a period of time (say in last week, or month or year). In an embodiment, the uptime numbers metrics 101 may also store additional insights relating to uptime of the product like a products uptime performance percentile as compared to other products, impact of uptime over a given period etc. In an alternate embodiment, the uptime numbers metrics 101 may only store basic raw data regarding uptime of a product and these insights are calculated on real time, as and when required. Similarly, product health metrics 102 provides product level performance relating to health of a product, i.e. relating to error rate, response time etc. The present disclosure is neither limited to the performance parameters provide by each of these metrics nor is limited to these metrics only. For instance, at product level, only two metrics uptime numbers metrics 101 and product health metrics 102, have been shown in FIG. 1, however, any number of such metrics may be available for implementing observability of an asset, in accordance with the present disclosure.

Similar to the two metrics (i.e. uptime numbers metrics 101 and product health metrics 102) at the product level, at infrastructure level, two metrics infrastructure metrics 103, tracing metrics 104 have been provided in FIG. 1, in accordance with the present disclosure. These metrics provide insights regarding the performance of an asset at infrastructure level. At this level, details relating to performance of system resources may be provided. At the next level, two metrics service health metrics 105, and service metrics 106, provide further detailed insights at service level, i.e. relating to performance of each service within a product. While the present disclosure has shown metrics at three level, with each having two metrics, the present invention is not limited to only these metrics and any number of metrics which are relevant for implementing observability may be provided.

As per an embodiment of the present disclosure, to implement observability, based on these six metrics, as shown in FIG. 1, the metrics must first be obtained at the server 110. Information about various elements of an asset are usually available in the form of separate metrics, as well as raw data which form the basis of any of the metrics. However, for an asset involving several products which may be implemented on a cloud at different locations and are using different technologies, obtaining all these metrics may not be possible based on a single communication request (or interface). As the quantification or measurement of each of these metrics may be implemented as a standalone module, one or more different communication interfaces for accessing and retrieving each metrics may be required. As per the present disclosure, the server 110 obtains these metrics by forming a two-way communication interface by, for example, utilizing APIs to communicate with each of these modules. To implement observability as per the present disclosure, existing APIs available in the form the communication interface may be utilized, or if required, an API may be developed to ensure seamless access to the metrics for implementing observability. In accordance with the present disclosure, the communication interfaces formed for accessing the metrics associated with one or more devices in an asset are providing these metrics in real time, to implement observability in the form of a live dashboard for a user. In other implementations, the access to some (or all) metrics may not be in real time and the dashboard provided to the user may be static and updated at a predetermined interval or on demand by the user.

As per an embodiment of the present disclosure, six exemplary metrics 101 to 106 are implemented as standalone intelligent modules which not only store their respective performance metrics and the underlying data, but are also trained to provide only relevant information to implement observability. For instance, if a product uptime related dashboard is to be displayed for a user with a year wise view, the server 110 will request the uptime numbers metrics module 101 for the relevant information. In a given embodiment, the uptime numbers metrics 101 is an intelligent module and based on the requirement of user that year wise information regarding uptime is needed, the module will first perform required calculations on the basic uptime data available and then will provide the required metrics to the server 110 for implementing observability. In one embodiment, the instructions may be executed by an intelligence engine like an ML (Machine Learning) data model for providing the metrics to the server 110, such that the ML data model performs required calculations not only based on the current user requirement but also based on the past request. In an alternative embodiment, the uptime numbers metrics 101 will provide the basic uptime data to the server 110 and is then processed at the server to implementing observability. Similar to the interface for accessing information from uptime numbers metrics 101, one or more interface may be utilized for obtaining information from other metrics of FIG. 1.

As per an embodiment of the present disclosure, the information obtained from various metrics is stitched together at server 110 to implement observability of an asset. Particularly, while the information obtained from various metrics is relevant for monitoring of various aspects of an asset, however for implementing observability the information obtained must be combined together to provide user the relevant insights. In this regard, for the system of FIG. 1 of the present disclosure, let us assume that an uptime calculation dashboard for a user is to be implemented for setting up observability. For setting up the first level (i.e. product level) view, the information obtained from product level metrics, i.e. uptime numbers metrics 101 and product health metrics 102 may be combined. If an asset has 20 products, then, uptime numbers metrics 101 and product health metrics 102 may be obtained for all of them. To show product level uptime dashboard, product uptime information for a given period and product error rate will be needed from uptime numbers metrics 101 and product health metrics 102 respectively. The dashboard may require product observability sorted by uptime in decreasing order with product error rate as governing factor to highlight products in different colours (say red for maximum error and green for minimum error) in a dashboard. Accordingly, the information from one or more metrics is stitched together to implement observability. Still further, the present disclosure is not limited to only product level metrics for implementing product level observability, but the information for other metrics may also be utilized. For instance, in the present example of setting Uptime calculation dashboard, in addition to uptime numbers metrics 101 and product health metrics 102, insights from service health metrics 105 may also be required, such that dashboard may provide product observability sorted by decreasing order with product error rate as governing factor to highlight a product in different colours while also displaying average service health (of all services of a product) over a given period of time (obtained from service health metrics 105). Likewise, other layers of the dashboard may set up by stitching relevant metrics.

As explained above, based on the dashboard to be presented information from one or more metrics may be stitched together. The server 110, which obtains various metrics may perform the stitching based on a mapping which may be stored on the server 110 or may be obtained from a separate memory. The mapping may be based on the type of dashboard desired to implement observability and can be modified. As per the present disclosure, a user may set up observability by selecting the type of dashboard that it to be implemented. The type of dashboard may be selected from a template like SRE Dashboard, Postgres Dashboard, Cost Dashboard, Security Dashboard, Uptime Calculations etc. Also, the user may be provided ability to create customized dashboard. In an alternative embodiment, implementation of a dashboard may without any user inputs and the observability is implemented based on a default template for a user.

As per the present disclosure, the dashboard created may also vary based on the user requesting the observability. Accordingly, depending on the user for whom the observability is being implemented, the fields, items, layers in the dashboard can be different and are decided based on mapping provided for each user. For instance, cost dashboard for the end user of an asset may have a view providing cost of each product which the user is incurring. However, the cost dashboard for test engineer (who is managing the asset) may not by the cost of each product, rather the observability may be implemented from the perspective of showing cost of maintenance at service level only. Also, the observability implemented for a user can also depend upon their access rights to various levels of an asset.

Figure 2:
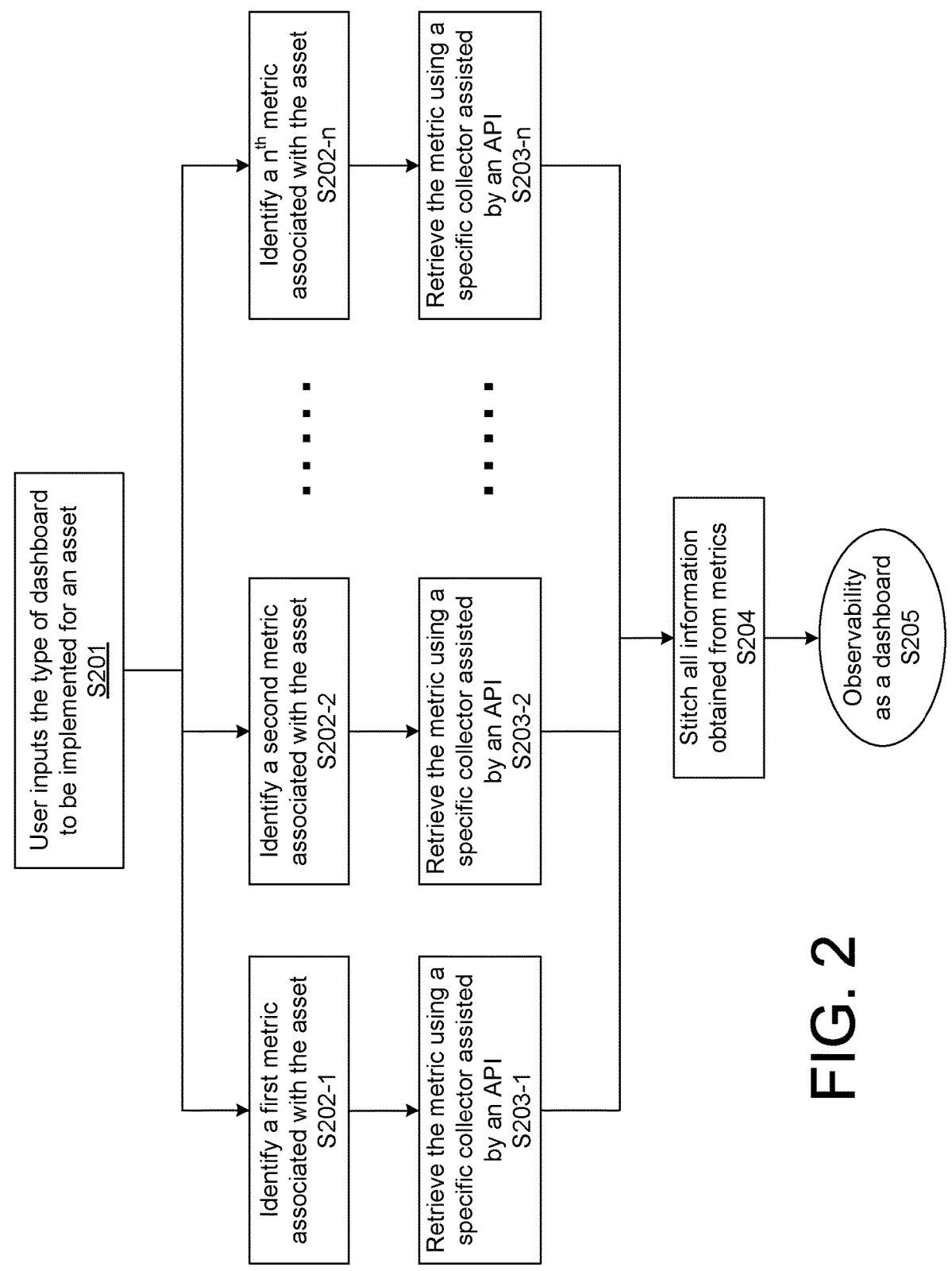
FIG. 2 illustrates a flow chart of the steps executed by a system for implementing observability, in accordance with an embodiment of the present invention.

The observability implemented by the present system is based on the monitoring of plurality of metrics of the asset. Metrics are used to analyse the performance of the asset and a metric represents a performance measurement of a computing resource of an asset. A characteristic of the computing resource may be represented by the numerical value of the corresponding metric. In certain instances, a metric may represent a data point of a time series of characteristic measurements taken from a computing resource. Measurement of metrics aids in obtaining an understanding regarding the availability, performance, and health of critical services of the asset. Hence obtaining and stitching of metrics constitutes an essential part of providing observability of an asset, and is performed by plurality of steps executed by the present system, as illustrated in FIG. 2. First, a user may input the type of dashboard to be for set-up for implementing observability at step S201. User may select to any one of known dashboard template like SRE Dashboard, Postgres Dashboard, Cost Dashboard, Security Dashboard, Uptime Calculations. Other inputs like where to store the dashboard, identification of asset for which the observability is to be implemented, region for which the observability is to be implemented may also be taken from the user. In an alternative embodiment, no user input may be taken and the observability is implemented based on default inputs for a user.

Thereupon, based on the user inputs, the present system identifies which metrics are relevant for setting up the required observability and a first metric may be identified at step S02-1. Based on the type of dashboard selected by the user, applicable metrics needed for implementing observability may be identified according to a mapping already stored in the sever. The applicable metrics may also be identified based on the final user, asset selected etc. Similarly, other relevant metrics may be identified at steps S202-2 . . . S202-n. Thereupon, the first metric may be retrieved using a collector at step S203-1. The collector is a tool used for retrieving and aggregating relevant metrics related to the asset for monitoring purposes, and may be either obtained from an external source or may be developed as a component of the present system. In some embodiments of the present invention, the collector is developed according to the metrics monitored by the system. The functioning of the collector is assisted by an API (Application Programming Interface), where the API is used to enable the interaction of a device or system providing the metrics and the collector without the need of any external intervention. The API may be developed as a component of the system according to the collector it assists. Steps S202 and S203 are carried out for the plurality of metrics used by the system. Steps for identifying and retrieving of various metrics may be carried sequentially or together at once and the present disclosure is not limited by how the metrics are obtained. In one implementation the first metric may be infrastructure metric used for measuring the performance of various IT related infrastructure components such as operating systems, disk activity, servers, or virtual machines. The infrastructure metric is retrieved at step S2202-1 and retrieved by an infrastructure metric collector assisted by a corresponding API at step S03-1. A second metric may be service health metric used for indicating how each service of a given infrastructure has performed. The service health metric is identified at step S202-2 and retrieved by a service health metric collector assisted by a corresponding API at step S203-2. Similarly, an n$^{th}$ metrics may be identified at step S202-n and retrieved by the corresponding metric collector assisted by a corresponding API at step S203-n. In some embodiments, the collector of a metric may also be designed so as to perform calculations or processing of the metric collected. For instance, a collector used for collecting Uptime numbers metric may also perform calculations using the uptime numbers to derive data related to uptime of the asset.

The metrics obtained from processing of metrics collected by the plurality of collectors assisted by APIs may be stitched together at step S204. Data stitching is the process of combining different sets of related information into one common destination. There, the information can be merged, aggregated, summarized, mapped, and processed in many different ways. The end goal involved deriving valuable insights, building extensive profiles, or merging information from different entities into a single dashboard. In one embodiment, the stitching is performed based on the nature of data obtained from monitoring of metrics, and based on requirements of a user, such that the data of plurality of metrics is selected, grouped, mapped and calculations are performed thereon. As per the present disclosure, some or all of these steps may be performed on the data obtained from this plurality of metrics. In another embodiment, the processing of metrics and data collected from the server may be performed by execution of instructions performed by a software hosted by a computing device. The data obtained after stitching provides a holistic and cumulative understanding of the performance and faults of the asset, and provide indications as to possible faults that may arise.

The system hence obtains a stitched data at step S204 which reflects the observability of the asset. The stitched data is provided as output using a dashboard to enhance the visualization and ease of understanding of the stitched data in step S205. As mentioned above, the dashboard used for representing the output may be selected from a plurality of dashboard templates as per the nature of output obtained. The output is provided by means of dashboard such that the observability achieved is displayed or presented in an understandable and comprehensible manner to the user, and that the user may derive some learning or insight from the dashboard which aids in decision making of the user with respect to possible improvements or actions to be taken regarding performance of the asset.

Figure 3:
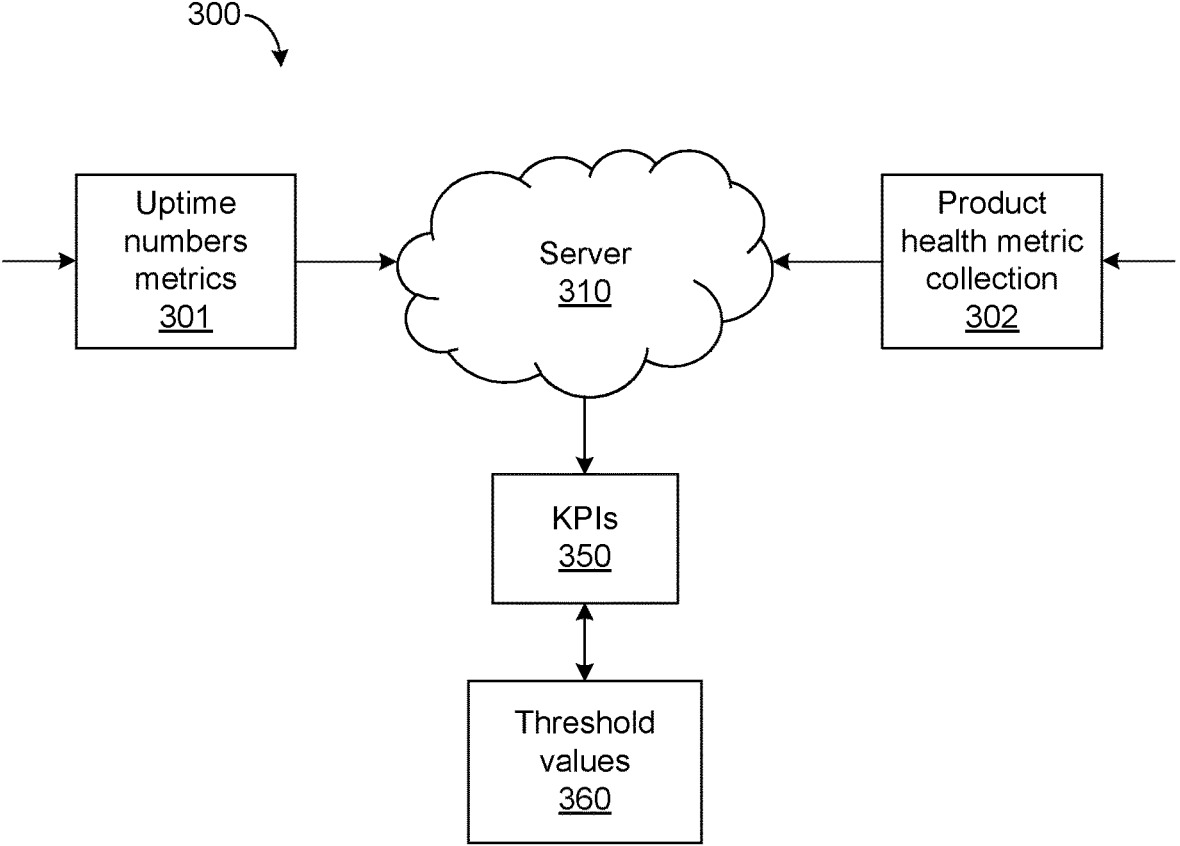
FIG. 3 illustrates a block diagram of a system for implementing observability on product level metrics and comparing KPIs with a threshold, in accordance with an embodiment of the present invention.

The observability implemented by the present disclosure is based on the monitoring of plurality of metrics of the asset. However, only monitoring of metrics may not provide complete evaluation of the system performance in every scenario. Therefore, to provide insights into root-cause of system issues, the present disclosure also provides evaluation of various metrics or the data of the metrics. As shown in FIG. 3, for implementing observability at product level, various product level metrics are combined to indicate performance of various products of an asset. To implement the same at product level, as shown in FIG. 3, product level metrics uptime number 301 and product health metric 302 are combined to provide product level insights in the form of Key Performance Indicator (KPI) 350 of the asset. In this regard, to show product level uptime dashboard, product uptime information for a given period and product error rate will be needed from uptime numbers metrics 301 and product health metrics 302 respectively. The dashboard may require product observability sorted by uptime in increasing order with product error rate as governing factor to highlight products in different colours in a dashboard. Accordingly, the information from one or more metrics is stitched together to implement observability. Further, in addition to stitching of metrics, the present discourse also evaluates these KPIs of product level metrics. Herein, the product level metrics uptime number 301 and product health metric 302 which are combined together to provide KPI which is compared with a threshold to provide an evaluation at the product level.

The comparison of Key performance indicators (KPIs) with a threshold value 360 provides performance indication of various products of an asset and can be shown as depict insights regarding an asset. The comparison of the KPIs with a threshold can be of the metrics directly or can be at the data level of these metrics. Still further, the comparison can be of the KPIs obtained from combining of two or more metrics in accordance with the present disclosure. The threshold reference for the comparison can be pre-defined or can be selected/updated by the user as part of user input provided for setting up observability. Based on comparison with the threshold, the product level performance can be evaluated in accordance with FIG. 3. This comparison will not only evaluate performance of various products of an asset but also identifies products which are lacking in performance and/or are likely to poorly perform in the future. The pre-defined threshold value can be decided based on the level of system performance desired and the threshold value can even be adaptive. For instance, the system may be setup to evaluate performance with 90% as threshold for identifying a poorly performing product. This value of 90% can be pre-defined at the system setup or can be an input provided by the user. Further, the system may itself change this value say from 90% to 95% over a period of time for better optimizing the system.

Further, based on comparisons of KPIs and the threshold, if one or more KPI are below their respective threshold, one or more alerts (or prompts) may be transmitted to a user. Such alerts can be sent in the form of one alert for each KPI or can be sent together as a single alert cumulative for all KPIs, which are not meeting the threshold. Still further, the alerts may be sent each time a user request for setting up of observability or such alerts may be sent at periodic intervals, irrespective of the user request. Also, the alerts may be sent to one or more users, as configured in the system. For instance, an alert regarding the KPIs which are not meeting the threshold may be sent a user involved in maintenance of the IT system of the asset. Also, the alerts may be sent to owner of the asset for performance evaluations. Once the KPIs are obtained and are compared with the threshold, they can be shown together to provide observability to a user. Such observability in the form of a dashboard will not only provide user information of various products, but also the performance evaluation of each product in a single view to help user identify, track and resolve problems. Also, while the present disclosure shows KPIs 350 and threshold values 360 as separate modules, but the same may be part of a single module or even be part of the server 310. In an embodiment, one or more modules (not shown) of the system may be implemented using electronic hardware, computer software, or any combination thereof. Whether such elements are implemented as hardware or software depends upon the application and design constraints imposed on the overall system. Examples of the systems may include computing systems (e.g., servers, datacenters, desktop computers, Internet of Things devices, etc.) and mobile computing systems (e.g., laptops, cell phones, etc.). Although components are described with respect to functional limitations, it should be understood that the particular implementations necessarily include the use of particular computing hardware. It should also be understood that in some embodiments certain of the components described herein include similar or common hardware.

Metrics or their underlying data are combined to obtain insights of various products of an asset. Relevant metrics (or their underlying data) are utilized to derive KPIs of an asset, which may be average resolve time, repeated errors in 24 hours, errors needing more than 72 hours to resolve etc. Once these KPIs are determined, they can be compared with a pre-defined threshold to provide additional insists regarding the performance of various products of an asset. The comparison with the threshold allows identification of products which are not meeting performance expectations as well as can help is identifying relevant issues. As per the present disclosure, the observability provided to a user includes performance insights of various products of an asset and indication regarding the products not meeting the threshold. Such details regarding various products of an asset allow a user to plan, foresee and manage an asset with the additional insights provided in accordance with the present disclosure.

Figure 4:
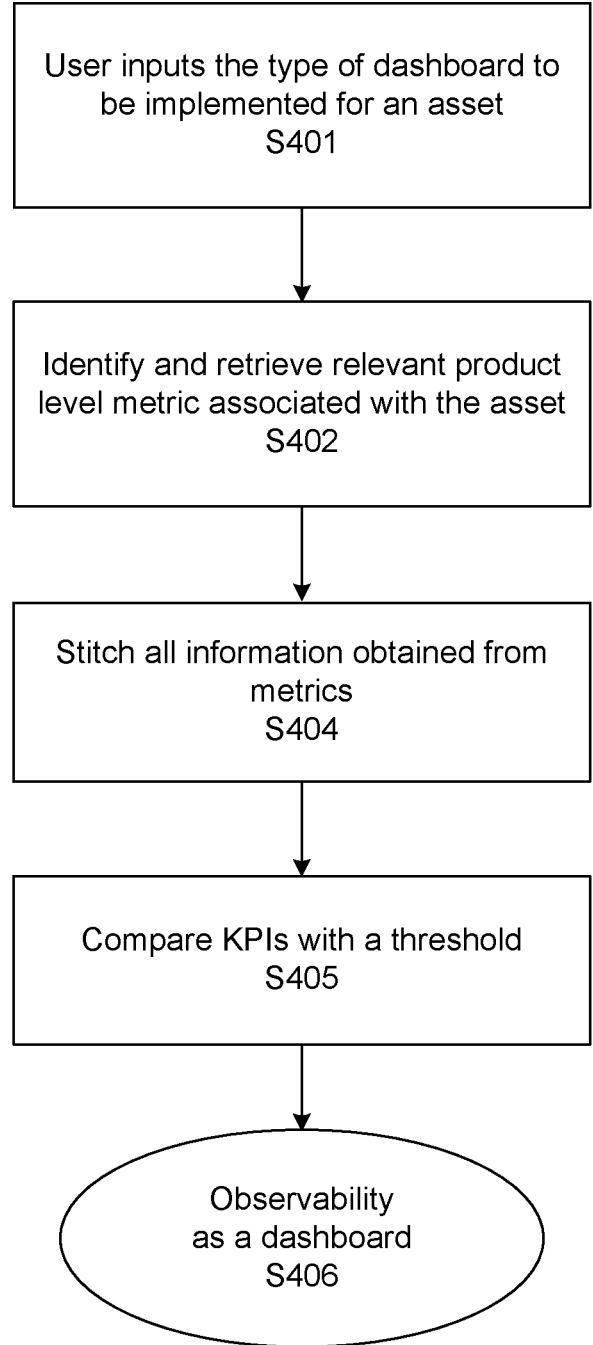
FIG. 4 illustrates a flow chart of the steps executed by a system for implementing observability on product level metrics and comparing KPIs with a threshold, in accordance with an embodiment of the present invention.

FIG. 4 provides a flowchart for implementing observability of product level metrics while comparing various KPIs with a threshold. As per the present disclosure shown in FIG. 4, a user may input the type of dashboard to be for set-up for implementing observability at step S401. User may select to any one of known dashboard template. Other inputs relating to the identification of an asset for which the observability is to be implemented, region for which the observability is to be implemented may also be taken from the user. As per the present disclosure, no user input may be taken and the observability is implemented based on default inputs. Based on the user inputs, the present system identifies which product metrics are relevant for setting up the required observability and retrieves them at step S402. Based on the type of dashboard selected by the user, applicable metrics needed for implementing observability may be identified according to a mapping already stored in the sever. The applicable metrics may also be identified based on the user input, asset selected etc. One of more of relevant metrics may be identified and retrieved at step S402.

The metrics may be retrieved using a collector. The collector is a tool used for retrieving and aggregating relevant metrics related to the asset for monitoring purposes, and may be either obtained from an external source or may be developed as a component of the present system. In some embodiments of the present invention, the collector is developed according to the metrics monitored by the system. Steps for identifying and retrieving of various metrics may be carried sequentially or together at once and the present disclosure is not limited by how the metrics are obtained. In some embodiments, the collector of a metric may also be designed so as to perform calculations or processing of the metric collected. For instance, a collector used for collecting Uptime numbers metric may also perform calculations using the uptime numbers to derive data related to uptime of the asset. The metrics obtained are then stitched together at step S404. Data stitching is the process of combining different sets of related information into one common destination. There the information can be merged, aggregated, summarized, mapped, and processed in many different ways. The end goal involved deriving valuable insights, building extensive profiles, or merging information from different entities into a single dashboard. In an embodiment, the stitching may be performed based on the nature of data obtained from monitoring of metrics, and based on requirements of a user, such that the data of plurality of metrics is selected, grouped, mapped and calculations are performed thereon, which provides Key Performance Indicators (KPIs) of an asset. As per the present disclosure, some or all of these steps may be performed on the data obtained from these pluralities of metrics. In another embodiment, the processing of metrics and data collected from the server may be performed by execution of instructions performed by a software hosted by a computing device.

Then at step S405, the KPIs are compared with a predefined threshold to provide an evaluation at the product level. The comparison of the KPIs of the product level metrics with a threshold can be of the metrics directly or can be at the data level of these metrics. The comparison can be of the insights obtained from combining of two or more metrics in accordance with the present disclosure. The threshold reference for the comparison can be pre-defined or can be selected/updated by the user as part of user input provided for setting up observability. Based on comparison with the threshold, the product level performance of an asset can be provided. The comparison will not only evaluate performance of various products of an asset but also identifies products which are lacking in performance and/or are likely to poorly perform in the future. The pre-defined threshold value can be decided based on the level of system performance desired and the threshold value can even be made adaptive.

Figure 5:
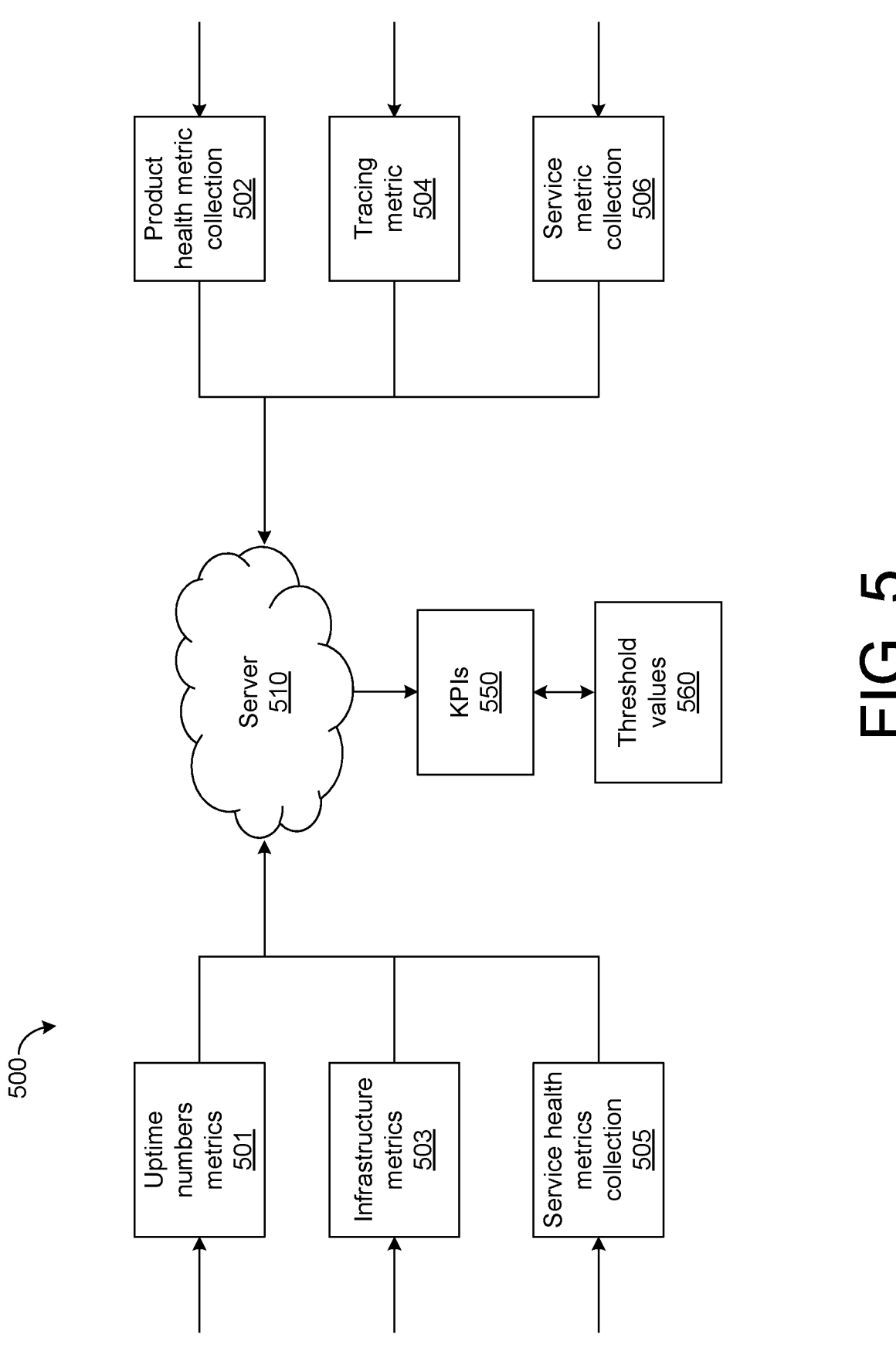
FIG. 5 illustrates a block diagram of a system for implementing observability on metrics of different levels and comparing KPIs with a threshold, in accordance with an embodiment of the present invention.

As per the present disclosure, implementing observability by combining metrics at various levels to obtain KPIs is shown in FIG. 5. In various embodiment, the monitoring of metrics is may be performed by methods including Health Check monitoring, APM monitoring, Uptime calculations and service level monitoring using tools including Kubernetes and Azure. The metrics used by the present system may include uptime numbers metrics 501, product health metrics 502, infrastructure metrics 503, tracing metrics 504, service health metrics 505, and service metrics 506. The metrics or data obtained from processing of metrics may be collected using a plurality of collectors assisted by APIs (Application Programming Interfaces), at a server 510. Data stitching involves aggregating of metrics obtained from different sources to provide user a meaningful observability of an asset. Observability is achieved from the stitched data as it provides a holistic understanding of the performance of the asset, identify faults and errors which may arise or have already occurred in the asset, and monitoring of the services provided by the asset. An asset may have one or more products in it and each of such product may have its own infrastructure. Further, each infrastructure of each of the product may have several individual services performing their assigned functionality. From the perspective of implementing observability of an asset, information (or metrics) relating to performance of each level (i.e. product, infrastructure and service) may be relevant. Therefore, for implementing observability, metrics relating to these levels must be obtained. However, for an asset involving several products each having its own infrastructure and services, the metrics may not be accessible at a single location and must be obtained. In accordance with the present disclosure, the communication interfaces formed for accessing the metrics associated with one or more devices in an asset are providing these metrics in real time, to implement observability in the form of a live dashboard for a user. In other implementations, the access to some (or all) metrics may not be in real time and the dashboard provided to the user may be static and updated at a predetermined interval or on demand by the user.

As per an embodiment of the present disclosure, the information obtained from various metrics is stitched together at server 510 to obtain KPIs of an asset. Particularly, while the information obtained from various metrics is relevant for monitoring of various aspects of an asset, however for implementing observability the information obtained must be combined together to provide user the relevant insights. In this regard, for the system of FIG. 5 of the present disclosure, for obtaining KPIs at the first level (i.e. product level), the information obtained from product level metrics, i.e. uptime numbers metrics 501 and product health metrics 502 may be combined. If an asset has 20 products, then, uptime numbers metrics 501 and product health metrics 502 may be obtained for all of them. Accordingly, the information from one or more metrics is stitched together to obtain KPIs. Still further, the present disclosure is not limited to only product level metrics for obtaining KPIs, but the information for other metrics may also be utilized. For instance, for deriving Uptime calculation related KPIs, in addition to uptime numbers metrics 501 and product health metrics 502, insights from service health metrics 505 may also be required, such that KPIs may be provided with product error rate as governing factor while also providing details relating to average service health (of all services of a product) over a given period of time (obtained from service health metrics 105). Likewise, other metrics at different layers may be stitched together to obtain KPIs. Further, in addition to stitching of metrics, the present discourse also evaluates these KPIs of product level metrics. Herein, metrics at different levels (i.e. product, infrastructure, and service levels) is combined together to provide KPIs which is compared with a threshold to provide an evaluation of the asset.

The comparison of the KPIs with a threshold can be of the metrics directly or can be at the data level of these metrics. Also, the comparison can be of the KPIs obtained from combining of two or more metrics in accordance with the present disclosure. The threshold reference for the comparison can be pre-defined or can be selected/updated by the user as part of user input provided for setting up observability. Based on comparison with the threshold, the combined performance based on metrics of different level can be evaluated in accordance with FIG. 5. This comparison will not only evaluate performance at various levels of an asset but also identifies products/infrastructures/services which are lacking in performance and/or are likely to poorly perform in the future. The pre-defined threshold value can be decided based on the level of system performance desired and the threshold value can even be made adaptive. Also, based on comparisons of KPIs and the threshold, if one or more KPI are below their respective threshold, one or more alerts may be transmitted to a user. Such alerts can be sent in the form of one alert for each KPI or can be sent together as a single alert cumulative for all KPIs which are not meeting the threshold. Once the KPIs are obtained and are compared with the threshold, they can be shown together to provide observability to a user. Such observability in the form of a dashboard will not only provide user information of various products, but also the performance evaluation of each product in a single view to help user identify, track and resolve problems. Also, while FIG. 5 shows KPIs 550 and threshold values 560 as separate modules, but the same may be part of a single module.

Figure 6:
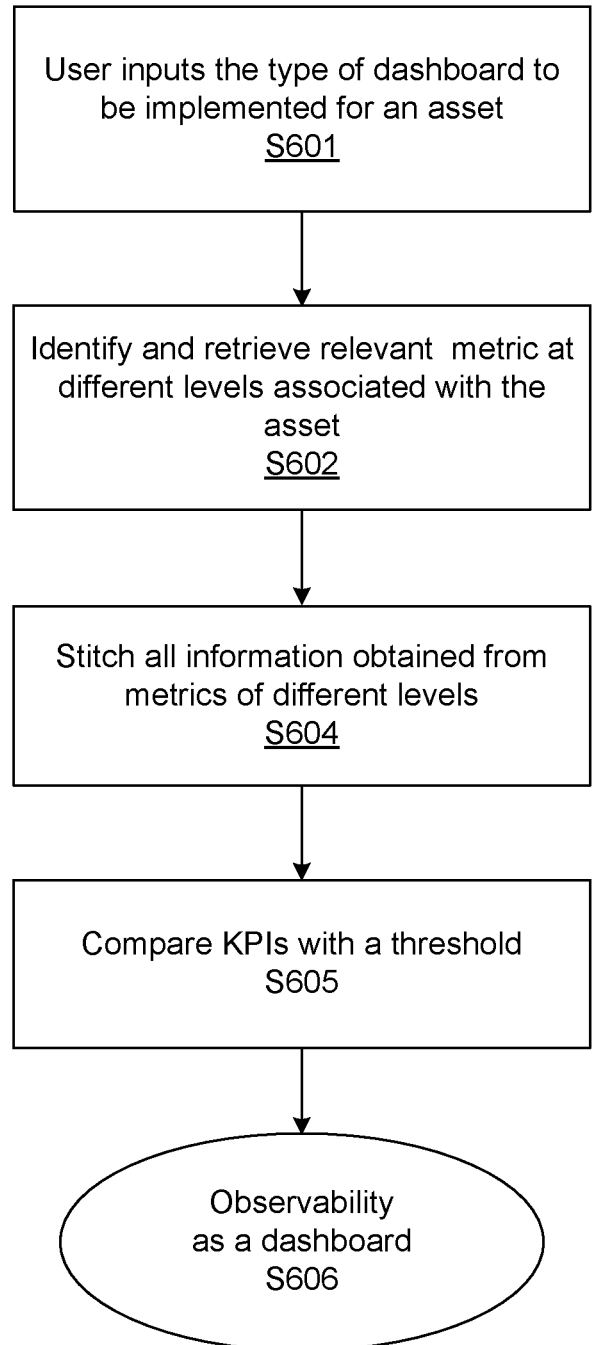
FIG. 6 illustrates a flow chart of the steps executed by a system for implementing observability on metrics of different levels and comparing KPIs with a threshold, in accordance with an embodiment of the present invention.

A flowchart for implementing observability of by combining metrics at different levels while comparing various KPIs with a threshold is provided in FIG. 6. As per the present disclosure shown in FIG. 6, a user may input the type of dashboard to be for set-up for implementing observability at step S601. User may select to any one of known dashboard template. As per the present disclosure, no user input may be taken and the observability is implemented based on default inputs. Based on the user inputs, the present system identifies which product/infrastructure/service level metrics are relevant for setting up the required observability and retrieves them at step S602. Based on the type of dashboard selected by the user, applicable metrics needed for implementing observability may be identified according to a mapping already stored in the server. The applicable metrics may also be identified based on the user input, asset selected etc. Steps for identifying and retrieving of various metrics may be carried sequentially or together at once and the present disclosure is not limited by how the metrics are obtained. In some embodiments, collector of a metric may be designed so as to perform calculations or processing of the metric collected. The metrics obtained are then stitched together at step S604.

A flowchart for implementing observability of by combining metrics at different levels while comparing various KPIs with a threshold is provided in FIG. 6. As per the present disclosure shown in FIG. 6, a user may input the type of dashboard to be for set-up for implementing observability at step S601. User may select to any one of known dashboard template. As per the present disclosure, no user input may be taken and the observability is implemented based on default inputs. Based on the user inputs, the present system identifies which product/infrastructure/service level metrics are relevant for setting up the required observability and retrieves them at step S602. Based on the type of dashboard selected by the user, applicable metrics needed for implementing observability may be identified according to a mapping already stored in the server. The applicable metrics may also be identified based on the user input, asset selected etc. Steps for identifying and retrieving of various metrics may be carried sequentially or together at once and the present disclosure is not limited by how the metrics are obtained. In some embodiments, collector of a metric may be designed so as to perform calculations or processing of the metric collected. The metrics obtained are then stitched together at step S604.

Data stitching involves combining different sets of related information into one common destination. There, the information can be merged, aggregated, summarized, mapped, and processed in many different ways. In one embodiment, the stitching is performed based on the nature of data obtained from monitoring of metrics, and based on requirements of a user, such that the data of plurality of metrics is selected, grouped, mapped and calculations are performed thereon, which provides Key Performance Indicators (KPIs) of an asset. As per the present disclosure, some or all of these steps may be performed on the data obtained from these pluralities of metrics. In another embodiment, the processing of metrics and data collected from the server may be performed by execution of instructions performed by a software hosted by a computing device. At step S605, the KPIs are compared with a pre-defined threshold to provide an evaluation at the different levels and combination thereof. The comparison of the KPIs with a threshold can be of the metrics directly or can be at the data level of these metrics. The comparison can be of the insights obtained from combining of two or more metrics in accordance with the present disclosure. Based on comparison with the threshold, the performance of an asset can be provided. The comparison will evaluate performance of various elements (i.e. products, infrastructure and services) of an asset and identifies elements which are lacking in performance and/or are likely to poorly perform in the future.

The nature of the output and the dashboard used for representing the output are provided to a user based on an input provided by the user to the system. The input may be provided to the system at a user device. The user device may be any computing device such as a laptop, computer, mobile phone etc. The user device acts as an interface of the system for receiving the input from the user. The input from the user may include instructions for creating a dashboard for representing the output. In one embodiment, the instructions may be provided in the form of options selected from a plurality of drop-down lists, check boxes etc. FIG. 7 illustrates a process flow for creating a dashboard, in accordance with an embodiment of the present invention.

The instructions collected from the user may also include instructions regarding specific outputs that may be required by the user. For instance, a user may not require an output result representing a complete and comprehensive view of all aspects of performance of the asset. Rather, the user may only require observability with respect to specific metrics of an asset, and may require customized information with respect to such metrics. Hence the instructions provided as input 721 to customise the output 722, of a processor 720 based on instructions stored in a memory 740, may be used as guidelines by the system regarding the specific metrics to be monitored and collected, specific calculations and processing to be performed on the metrics to obtain relevant data as per the input instructions, and the template of dashboard to be used for representing the data generated after stitching of metrics. The observability implemented by the present system is implemented in the form of output dashboard 731, of the input/output unit 730. In an embodiment, context or data regarding similar customizations and method adopted therein may be stored within the memory of the processor, and may be referred to for providing a quick output or assistance of current customization. Processor may be embodied in a number of different ways. In various embodiments, the use of the terms "processor" should be understood to include a single core processor, a multi-core processor, multiple processors and/or one or more remote or "cloud" processor(s). In some example embodiments, processor may include one or more processing devices configured to perform independently. In some embodiments, the processor 720 includes hardware, software, firmware, and/or a combination thereof that performs one or more operations described herein. The processor 720 may be configured to execute instructions stored in the memory 740 or otherwise accessible to the processor. Alternatively, the processor 720 may be configured to execute hard-coded functionality. As such, whether configured by hardware or software methods, or by a combination thereof, processor 720 may represent an entity (e.g., physically embodied in circuitry) capable of performing operations according to embodiments of the present disclosure while configured accordingly. Alternatively, the processor 720 may be embodied as an executor of software instructions, and the instructions may specifically configure the processor 720 to perform the various algorithms embodied in one or more operations described herein when such instructions are executed. In some embodiments, the processor 720 includes hardware, software, firmware, and/or a combination thereof that performs one or more operations described herein. In some embodiments, the processor 720 (and/or co-processor or any other processing circuitry assisting or otherwise associated with the processor) is/are in communication with the memory 740 via a bus for passing information. Memory 740 may be non-transitory and may include, for example, one or more volatile and/or non-volatile memories. In some embodiments, the memory 740 includes or embodies an electronic storage device (e.g., a computer readable storage medium). In some embodiments, the memory 740 is configured to store information, data, content, applications, instructions, or the like, for enabling processor 720 to carry out various operations and/or functions in accordance with example embodiments of the present disclosure.

Specific input instructions provided by a user for a customized output may also be satisfied based on use of specific monitoring tools or methods. The selection or use of specific monitoring methods or tools may also be based on the specific metrics to be monitored, and the tools best equipped or most appropriate for monitoring and processing such metrics. The operation of the collectors used for collecting and processing of the metrics may be customized to obtain the specific data or information. The specific data or information obtained by the collector may relate to specific performance related aspects of the asset, and may be stitched with other metrics and data to provide output as per user requirements. The customized output provided by the system may present observability with respect to certain aspects or components of the asset, as per the instructions provided by the user. The input/output unit 730 may be in communication with the processor to provide such functionality. The input/output unit 730 may comprise one or more user interface(s). In some embodiments, a user interface may include a display that comprises the interface(s) rendered as a web user interface, an application user interface, a user device, a backend system, or the like. In some embodiments, the input/output unit 730 also includes a keyboard, a mouse, a joystick, a touch screen, touch areas, soft keys a microphone, a speaker, or other input/output mechanisms. The processor 720 and/or input/output unit 730 comprising the processor may be configured to control one or more operations and/or functions of one or more user interface elements through computer program instructions (e.g., software and/or firmware) stored on a memory accessible to the processor (e.g., memory 740, and/or the like). In some embodiments, the input/output unit 730 includes or utilizes a user-facing application to provide input/output functionality to a computing device.

The output provided in the form of a dashboard is aimed at aiding the user in identifying the causes for sub-optimal performance of the asset, if any, and also aids the user in taking necessary steps to rectify such errors or avoid possible errors or faults that may arise in the asset. Further, the use of APIs, stitching of metrics by the processor, obtaining KPIs and comparing them with a threshold and the display of output using dashboards are implemented as a one-click process, i.e., the functionalities are performed as one implementation based on an input provided by a user. Furthermore, the interfaces formed with different metrics is active in real-time and it keeps on providing latest information for implementing real-time observability.

In one embodiment, the dashboards may be created using existing tools, and the tools selected may be capable of storing high volumes of data and retrieving data from different sources at quick rate. The tool used herein may provide a view of real time metrics of an asset may be monitored continuously. The tool used for generating dashboards, in addition to displaying a real-time view of metrics monitored and analysed and the results of such monitoring an analysis, may also provide alerts of different critical events associated with the performance of the asset. Further, the tool for displaying output using dashboards may also provide insights regarding possible steps to rectify existing faults, and warnings regarding possible faults that may arise in the future. The tools used herein may also display the output reflecting observability using multiple panels by a single click. FIG. 8 depicts a user interface of a tool for creating dashboards and possible inputs which may be provided by a user, in accordance with an embodiment of the present invention. In addition to selecting the type of dashboard, one or more inputs regarding to path for setting dashboard, asset/product of interest, region of interest may be provided by the user. The present disclosure is not limited to the inputs provided by the user and in an alternative implementation, the observability may be set-up without any user inputs.

FIG. 9 depicts a typical dashboard view which may be provided to a user. For instance, based on a user's input to generating an uptime dashboard, the present system displays the dashboard for the user for providing the observability at product level (level 1), infrastructure level (level 2) and service level (level 3). Each level depicts performance indicators relevant for this dashboard for various elements of a given asset. For instance, the first level indicates the uptime performance of each product (P1, P2, . . . Pn) of the asset, in the form of blocks. The dashboard will show various KPIs derived from various metrics as well as may show the comparison of the KPIs with a threshold. In addition to showing relevant information in the block, colour, size, shape of the block may also be varied to provide a better user experience in observing the system performance. The order of various blocks and the level may also be changed as per user requirement, type of dashboard, purpose of observability etc.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A system for metric collection and performance analysis of an asset in a network, comprising:

one or more processors;

a memory; and one or more programs stored in a memory, the one or more programs comprising instructions configured to:

identify a plurality of products associated with the asset, wherein each product is configured to generate one or more metrics associated with performance of said product;

retrieve one or more metrics associated with one or more products;

determine a key performance indicator for one or more of the metrics;

assign a threshold value to one or more key performance indicator to determine performance of the one or more products;

transmit a prompt to a user, when the key performance indicator associated with one or more products is below the threshold value; and generate a dashboard, said dashboard presenting a report corresponding to one or more key performance indicator for associated metrics and the threshold value, wherein the dashboard type is selected from a set of available templates.

2. The system of claim 1, wherein the processor is configured to resend the prompt after a predetermined time period, if the performance metrics associated with one or more asset is still below the threshold value.

3. The system of claim 1, wherein the metrics associated with the asset include service health metrics, infrastructure metrics, uptime numbers, product health metrics, tracing metrics, and service metrics.

4. The system of claim 1, wherein the metrics are stored for monitoring and the monitoring comprises Health Check monitoring, APM monitoring, Uptime calculations, Kubernetes monitoring and Azure monitoring.

5. The system of claim 1, comprises one or more collectors, said collectors are configured to access and retrieve one or more metrics associated with the asset.

6. The system of claim 1, wherein the retrieval of metrics is assisted by an API (Application Programming Interface).

7. The system of claim 1, wherein the identification and retrieval of the metrics is based on the dashboard.

8. The system of claim 1, wherein the templates of the dashboard type include SRE Dashboard, Postgres Dashboard, Cost Dashboard, Security Dashboard, Uptime Calculations Dashboard.

9. The system of claim 1, wherein the dashboard presenting the report highlight different key performance indicator with different color, shape and size.

10. A method comprising:

identifying a plurality of products associated with an asset, said product is configured to generate one or more metrics associated with performance of said product;

retrieving one or more metrics associated with one or more products;

determining a key performance indicator for one or more of the metrics;

assigning a threshold value to one or more key performance indicator to determine performance of the one or more products;

transmitting a prompt to a user, when the key performance indicator associated with one or more products is below the threshold value; and generating a dashboard, said dashboard presenting a report corresponding to one or more key performance indicator for associated metrics and the threshold value, wherein the dashboard type is selected from a set of available templates.

11. The method of claim 10, further comprising resending the prompt after a predetermined time period, if the performance metrics associated with one or more asset is still below the threshold value.

12. The method of claim 10, wherein the metrics associated with the asset include service health metrics, infrastructure metrics, uptime numbers, product health metrics, tracing metrics, and service metrics.

13. The method of claim 10, wherein the metrics are stored for monitoring and monitoring comprises Health Check monitoring, APM monitoring, Uptime calculations, Kubernetes monitoring and Azure monitoring.

14. The method of claim 10, wherein the retrieving of metrics is assisted by an API (Application Programming Interface).

15. The method of claim 10, wherein the templates of the dashboard type include SRE Dashboard, Postgres Dashboard, Cost Dashboard, Security Dashboard, Uptime Calculations Dashboard.

16. The method of claim 10, wherein the dashboard presenting the report highlight different key performance indicator with different color, shape and size.

17. The method of claim 10, wherein the identification and retrieval of the metrics is based on the dashboard.

18. A non-transitory computer-readable storage medium comprising computer program code for execution by one or more processors of an apparatus, the computer program code configured to, when executed by the one or more processors, cause the apparatus to:

identify a plurality of products associated with the asset, said product is configured to generate one or more metrics associated with performance of said product;

retrieve one or more metrics associated with one or more products;

determine a key performance indicator for one or more of the metrics;

assign a threshold value to one or more key performance indicator to determine performance of the one or more products;

transmit a prompt to a user, when the key performance indicator associated with one or more products is below the threshold value; and generate a dashboard, said dashboard presenting a report corresponding to one or more key performance indicator for associated metrics and the threshold value, wherein the dashboard type is selected from a set of available templates.

\* \* \* \* \*